United States Patent
Scheurle et al.

[15] 3,689,525
[45] Sept. 5, 1972

[54] P-ALKOXYPHENYL ESTERS OF 4-CAPRONYLOXY BENZOIC ACID

[72] Inventors: Bruno Scheurle, Konigstein, Taunus; Kans Kelker, Frankfurt am Main, both of Germany

[73] Assignee: Farbwerke Hoechst Aktiengesellschaft vormals Meister Lucius & Bruning, Frankfurt/Main, Germany

[22] Filed: Feb. 26, 1971

[21] Appl. No.: 119,349

[30] Foreign Application Priority Data

Feb. 28, 1970 Germany..........P 20 09 528.7

[52] U.S. Cl.........260/473 R, 260/479 R, 260/566 F, 252/408
[51] Int. Cl.................................C07c 69/78
[58] Field of Search.................................260/473 R

[56] References Cited
OTHER PUBLICATIONS

Meyers et al. Chem. Abst. 52 245/g.

*Primary Examiner*—Lorraine A. Weinberger
*Assistant Examiner*—John F. Terapone
*Attorney*—Henry W. Koster

[57] ABSTRACT

N-(4-methoxybenzylidene)-4'-O-n-butyrylaminophenol and 4-methoxy- or 4-ethoxybenzylidene-4'-n-butyl aniline form enantiotropic nematic phases which are stable at room temperature or slightly above. If as third component 4-capronylhydroxy benzoic acid-4-4'-alkoxy phenol ester is added wherein alkoxy stands for ethoxy and butoxy, nematic phases are obtained which have melting points below 0° C. The new nematogenic mixtures are useful for example as solvents for the NMR-spectroscopy.

3 Claims, No Drawings

P-ALKOXYPHENYL ESTERS OF 4-CAPRONYLOXY BENZOIC ACID

The present invention relates to novel nematogenic compounds of the general formula

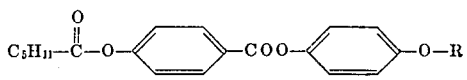

in which R represents an ethyl or butyl radical.

This invention relates to nematogenic mixtures which consist of one of the above compounds, N-(4-methoxy-benzylidene)-4'-0-n-butyryl aminophenol and 4-methoxy- or 4-ethoxy-benzylidene-4'-n-butyl aniline.

The subject of our copending application, Ser. No. 37,871 filed May 15, 1970 are the azomethine type compounds 4-methoxy-benzylidene-4'-n-butyl aniline

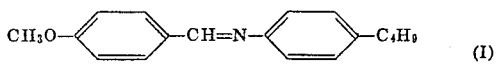

and 4-ethoxy-benzylidene-4'-n-butyl aniline

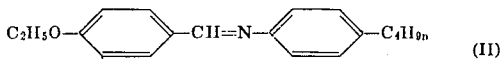

which form enantiotropic nematic phases in the range of room temperature or slightly above and the nematic phases of which lie within the range of persistency from 20° to 30° C. In particular, 4-methoxy-benzylidene-4'-n-butyl aniline having a melting point of 20° C. and a transition point of approximately 42° C. represents for the first time a compound which permits to work with nematic liquids without complicated thermostatization slightly above normal room temperature.

However, it is desirable to find nematic liquids having a melting point that is still lower and having a range of persistency that is still wider so that thermostatization may not be necessary at all.

It has been found that the compound N-(4-methoxy-benzylidene)-4'-O-n-butyryl aminophenol of the formula

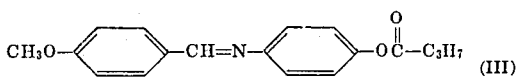

is a mixing component the addition of which leads to a higher nematic isotropic (n/i) transition point of the above compounds I and II. A mixture of 2 moles of compound I and 1 mole of compound III has a n/i transition point of 70° C., which is, thus, by about 30° C. higher than that of pure compound I. However, the melting point of the mixture lies hardly below that of pure compound I.

It has also been found that nematic mixed phases having a melting point below 0° C. can be obtained if 4-capronylhydroxy-benzoic acid-4'-ethoxy-phenyl ester of the formula

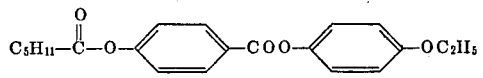

or 4-capronylhydroxy-benzoic acid-4'-butoxy-phenyl ester of the formula

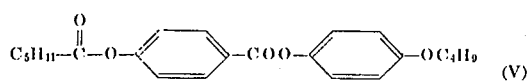

is added as third component.

These compounds are novel and nematogenic themselves.

Compound IV was prepared as follows:

A solution of 21 grams of 4-hydroxy-phenetole in 300 milliliters of benzene were added to a solution containing 49.3 grams of 4-capronylhydroxy-benzoyl chloride in 250 milliliters of benzene. Fifteen milliliters of pyridine in 100 milliliters of benzene were added dropwise to this solution. The reaction mixture was then boiled under reflux for 3 hours. After cooling the pyridine hydrochloride precipitated was filtered off. Then the benzenic solution was washed with diluted sodiumhydroxide solution and subsequently with water, dried over sodium sulphate and finally the benzene was distilled off. The distillation residue was recrystallized from hexane. The 4-capronylhydroxy-benzoic acid-4'-ethoxy-phenyl ester melts at 64° to 65° C. to yield a nematic melt having a n/i-transition point between 100° to 101° C.

Compound V is prepared in analogous manner using 4-capronylhydroxy-benzoyl chloride and 4-hydroxy-phenyl-butyl ether; it has a melting point of from 59° to 60° C. and a n/i-transition point between 89° to 90° C. (from hexane).

Mixtures having the lowest melting points and the widest range of persistency of the nematic liquid have the following composition:

| Composition | Properties |
|---|---|
| 2 moles of Compound I<br>2 moles of Compound III<br>1 mole of compound IV | melting point : −3°C<br>n/i-transition point: +80°C |
| 2 moles of compound I<br>2 moles of compound III<br>1 mole of compound V | melting point : −2°C<br>n/i-transition point: +75°C |
| A mixture consisting of<br>3 moles of compound I<br>2 moles of compound III<br>1 mole of compound IV | melting point : −3°C<br>n/i-transition point: +62°C | has likewise a melting point below 0° C. but a less wide range of persistency. Of course, mixtures containing compound II have higher melting points.

An important advantage of the novel nematogenic mixtures is their stability. They have no tendency to crystallize out or to dissociate. They may be mixed with relatively large amounts of dissolved foreign substances without losing their nematic character, for example, with up to 9 percent of benzene. They show a pronounced "dynamic scattering" effect and are well suitable as solvents for nuclear magnetic resonance spectroscopy.

What is claimed is:

1. A nematogenic compound of the formula

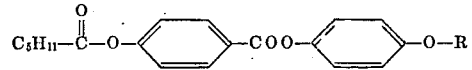

in which R represents an ethyl or a butyl radical.

2. The nematogenic compound 4-capronylhydroxy-benzoic acid-4'-ethoxy-phenyl ester of the formula

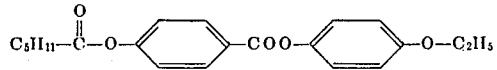

3. The nematogenic compound 4-capronylhydroxy-benzoic acid-4'-butoxy-phenyl ester of the formula
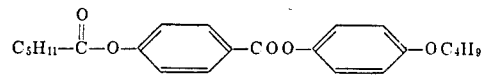
* * * * *